Sept. 15, 1964     T. R. SCHUERGER ETAL     3,149,192
APPARATUS AND METHOD FOR CONTROLLING SPEED OF A TRAVELING MEMBER
Filed March 28, 1958     2 Sheets-Sheet 1
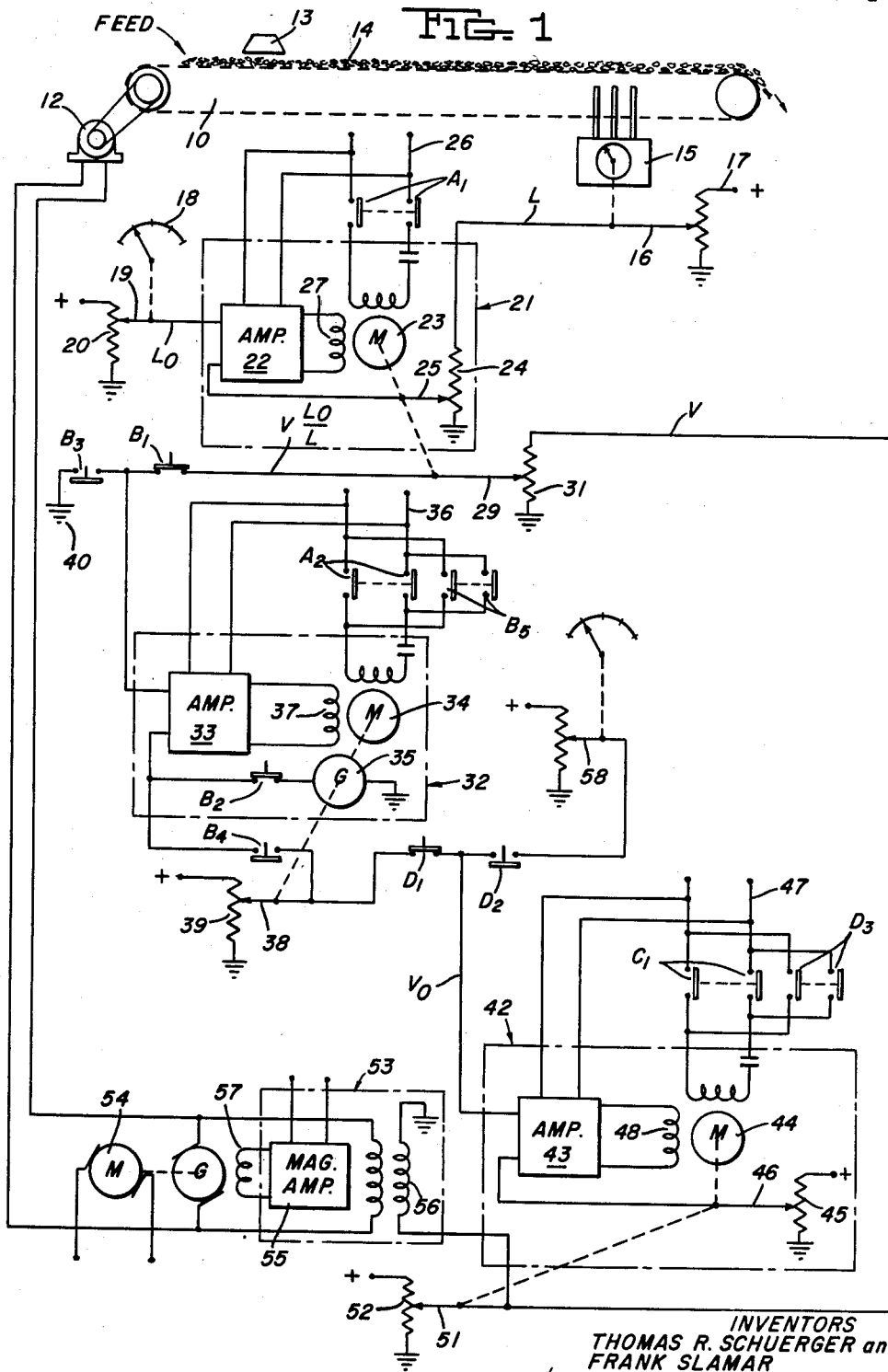
INVENTORS
THOMAS R. SCHUERGER and
FRANK SLAMAR
By Donald G. Dalton
Attorney Sept. 15, 1964   T. R. SCHUERGER ETAL   3,149,192
APPARATUS AND METHOD FOR CONTROLLING SPEED OF A TRAVELING MEMBER
Filed March 28, 1958   2 Sheets-Sheet 2
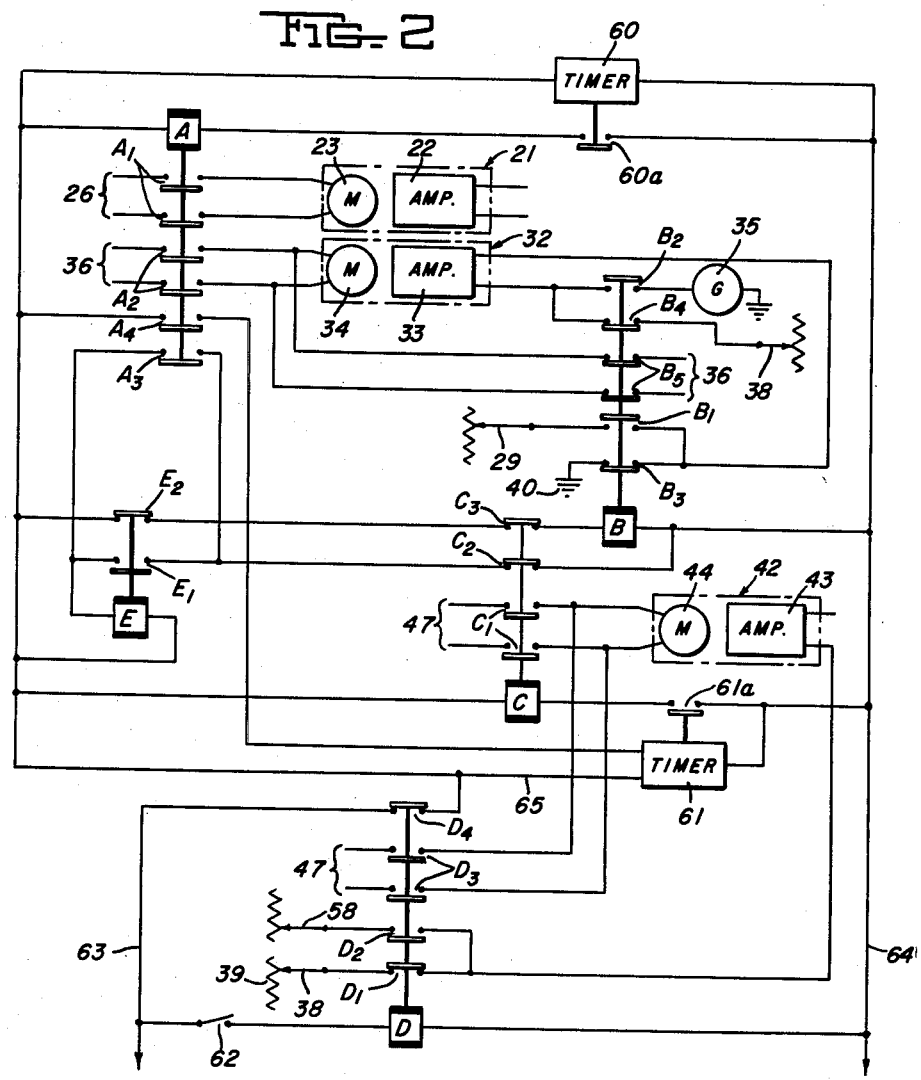
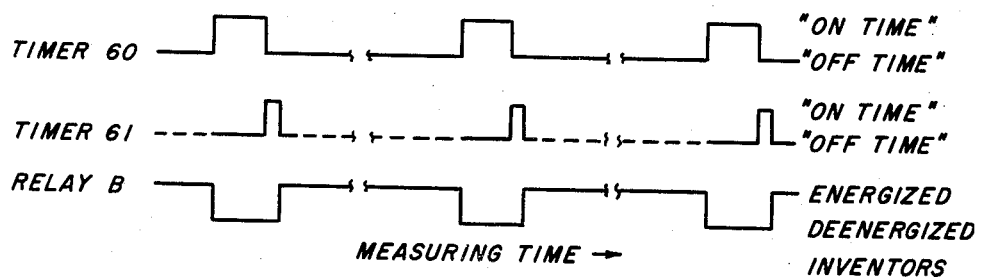
INVENTORS
THOMAS R. SCHUERGER and
FRANK SLAMAR
By Donald G. Dalton
Attorney

United States Patent Office 3,149,192
Patented Sept. 15, 1964

3,149,192
APPARATUS AND METHOD FOR CONTROLLING SPEED OF A TRAVELING MEMBER
Thomas R. Schuerger and Frank Slamar, Monroeville, Pa., assignors to United States Steel Corporation, a corporation of New Jersey
Filed Mar. 28, 1958, Ser. No. 724,688
18 Claims. (Cl. 266—21)

This invention relates to an improved apparatus and method for controlling the speed of a continuously traveling member.

The invention is applicable broadly to operations in which it is desired to control the speed of a traveling member to assure that some action takes place at a desired location on the member, the location of the action being determinable but subject to shifting. The invention is particularly applicable to traveling grate sintering machines for controlling the location at which combustion is completed, commonly referred to as the "burn-through point." Therefore we have described the invention as applied to a sintering machine, but this description is not to be construed as limiting the invention.

In a conventional traveling grate sintering machine, a mix composed of metal-bearing particles and fuel in carefully regulated proportions feeds to the grate adjacent its entry end. The upper surface of the resulting bed is ignited shortly beyond the line of feeding. Air is drawn or forced downwardly through the bed, and combustion proceeds in a thin zone which slopes downwardly from the line of ignition to the burn-through point. For efficient operation the burn-through point must lie a short predetermined distance ahead of the discharge end of the grate. If it lies too close to the discharge end, the finished sinter contains unburned fuel and is of poor quality. If it lies too far away, the full capacity of the machine is not utilized. The location of the burn-through point is of course a function of the grate speed.

An earlier application of George Dykeman jointly with the present co-inventor Schuerger, Serial No. 602,859, filed August 8, 1956 (now Patent No. 2,878,003), discloses and claims an indicator for determining the actual location of the burn-through point and a control responsive to this indicator for automatically adjusting the grate speed to shift the burn-through point to the desired location. The control shown in said application has a disadvantage that, when the indicator determines a speed correction is needed, the magnitude of this correction is not taken into account as the correction is applied. As long as the indicator shows need for any correction, the control periodically changes the grate speed by a series of uniform increments. Consequently adjustments are arbitrary and inaccurate and tend to overshoot the desired speed, and an undesirable hunting condition results.

An object of the present invention is to provide a precise control for regulating the speed of a traveling member in accordance with determinations by a suitable indicator, which control accurately computes a corrected speed needed to shift the location of an action to a desired location, periodically changes the speed to the corrected speed thus computed, and periodically repeats this cycle.

A further object is to provide a control of the foregoing type which eliminates effects of minor fluctuations in the location where the action takes place, but computes the corrected speed on the basis of an average location over a definite time interval.

A further object is to provide an improved speed control method in which the magnitude of variances between the actual and desired location where an action takes place is determined, a corrected speed needed to shift the location to the desired location is computed periodically, and the speed is changed to the corrected speed thus computed, the new speed being held until another corrected speed has been computed.

A more specific object, as applied to sintering, is to provide an improved speed control for use in the combination shown in the Dykeman and Schuerger application, which control periodically computes the corrected speed needed to shift the burn-through point from the location determined by the burn-through indicator to the desired location and then corrects the speed to this exact value.

In accomplishing these and other objects of the invention, we have provided improved details of structure, a preferred form of which is shown in the accompanying drawings, in which:

FIGURE 1 is a schematic diagram of our control applied to a sintering machine, the timing means being omitted to simplify the illustration;

FIGURE 2 is a schematic wiring diagram of the timing means used with our control; and FIGURE 3 is a graph showing the sequence of operations.

FIGURE 1 shows diagrammatically a conventional sintering machine which includes a traveling grate 10, a variable speed D.-C. drive motor 12, and an ignition hood 13. Sinter mix feeds to the grate adjacent the left end as viewed in the figure, forms a bed 14 on the grate, and finished sinter discharges from the right end. The machine of course includes other conventional elements, such as windboxes and fans or blowers, which are omitted for simplicity since no showing is needed for an understanding of the present invention. The machine is equipped with a burn-through indicator 15 which can be identical with that shown in the Dykeman and Schuerger application; therefore the showing is not repeated here.

The burn-through indicator 15 includes a servomotor (designated 30 in the Dykeman and Schuerger application) which is mechanically connected to the arm 16 of a potentiometer 17. Thus the indicator 15 positions this arm along the potentiometer slide wire in accordance with the actual distance L between the ignition point as a datum line and the burn-through point. A set point indicator 18 is mechanically connected to the arm 19 of another potentiometer 20 to position this arm along the potentiometer slide wire in accordance with the desired distance $L_0$ between the same datum line and the burn-through point. The respective slide wires are connected to suitable D.-C. voltage sources, whereby arms 16 and 19 transmit voltages proportionate to L and $L_0$ respectively.

Divider

Arms 16 and 19 are electrically connected to a divider 21, which computes the variance between the actual and desired locations of the burn-through point as a ratio $L_0/L$. The divider includes an electronic conversion amplifier 22, a servomotor 23 and a potentiometer 24 whose arm 25 is mechanically connected to the servomotor. Arm 19 is electrically connected to one input terminal of the amplifier, whereby the voltage applied to this terminal is proportionate to $L_0$. Arm 16 is electrically connected to one end of the slide wire of potentiometer 24, and arm 25 of the latter potentiometer is electrically connected to the other input terminal of the amplifier. Thus the voltage applied to the latter terminal is proportionate to L multiplied by a fraction whose value depends on the linear position of arm 25 with respect to its slide wire. Amplifier 22 and servomotor 23 are electrically connected to a suitable A.-C. source 26. The output terminals of amplifier 22 are electrically connected to a field winding 27 of the servomotor. Amplifier 22 has the characteristic that it energizes the servomotor in the appropriate direction whenever its two input terminals are at different voltages. When the servomotor runs, it moves arm 25 along its slide wire in a direction to equalize the voltages applied to the input terminals. When these voltages become equal, the servomotor stops and the linear position of arm 25 with respect to its slide wire affords a measurement of the ratio $L_0/L$. This computation can be made continuously, but it is used only periodically. We prefer not to operate the equipment unnecessarily; therefore we include normally open contacts $A_1$ of a relay A in series with the servomotor. The relay itself is part of the timer circuit hereinafter described, and it automatically closes these contacts whenever a computation is to be made.

The amplifier 22 per se is a known device and hence has been shown only in block form, but reference can be made to Wills Patent No. 2,423,540 for a complete showing of a suitable amplifier of this type. A suitable amplifier is available commercially from Minneapolis-Honeywell Regulator Company under the trade name "Electronik," No. 356,358, and is described in a printed publication by the manufacturer entitled "Service Manual 15019 M for Class 15 'Electronik' Instruments," Issue 8 (1956).

The servomotor 23 of the divider 21 also is mechanically connected to the arm 29 of a potentiometer 31. The slide wire of this potentiometer is connected to a D.-C. voltage source which applies a voltage proportionate to the present speed V of grate 10, as hereinafter explained. Arm 29 assumes a position in accordance with the ratio $L_0/L$, whereby it transmits a voltage proportionate to the product $V(L_0/L)$. If there were no minor fluctuations to consider, the corrected grate speed $V_0$ would equal this product, since the corrected speed $V_0$ bears the same ratio to the actual speed V as the desired distance $L_0$ between the ignition point and the burn-through point bears to the actual distance L, that is $$\frac{V_0}{V}=\frac{L_0}{L}$$

However, we preferably apply the voltage transmitted by arm 29 to an integrator 32 for the purpose of computing an average value of $V(L_0/L)$ over a definite time interval and thus eliminating effects of minor fluctuations or "noise" in the measured distance L.

*Integrator*

The integrator includes an electronic conversion amplifier 33 (similar to amplifier 22), a servomotor 34, and a tachometer-generator 35 mechanically connected to the servomotor. The servomotor is a two-phase A.-C. induction motor which has the characteristic that under transient conditions its speed varies with the voltage applied to its field. We have not described the motor in detail since it is a known device, but for a complete description reference can be made to Thaler and Brown, "Servomechanisms Analysis," copyright 1953 by McGraw-Hill Book Company, Inc., pages 63 and 391. One input terminal of amplifier 33 is electrically connected to arm 29 of potentiometer 31, whereby the voltage applied to this terminal is proportionate to $$V\frac{L_0}{L}$$

but subject to fluctuations. The other input terminal of the amplifier is electrically connected to the generator 35, whereby the voltage applied to the latter terminal is proportionate to the output of the generator. The voltages applied to the two input terminals are of the same polarity, but the latter is smaller. Amplifier 33 and servomotor 34 are electrically connected to a suitable A.-C. source 36. The output terminals of amplifier 33 are electrically connected to a field winding 37 of servomotor 34. Normally open contacts $A_2$ of relay A are connected in series with servomotor 34, and are closed automatically by the timer circuit for a definite interval, for example one minute, when a computation is to be made. It should be pointed out that the integrator 32 is not a null-seeking device like the divider 21, but voltages applied to its two amplifier input terminals approach values which differ by an amount proportionate to the voltage to be integrated. The amplifier 33 allows the servomotor 34 to run as long as contacts $A_2$ remain closed.

The action of the integrator can be explained mathematically as follows:

Let $e_1$ represent the input voltage to the amplifier proportionate to $$V\frac{L_0}{L}$$

$e_2$ represent the input voltage to the amplifier derived from the tachometer-generator;

$t$ represent the time interval the servomotor runs for each computation; and $x$ represent the number of revolutions of the tachometer-generator during time $t$.

Then $(e_2-e_1)$ is the effective voltage which tends to drive the servomotor; and $dx/dt$ is the angular velocity of the tachometer-generator.

$$e_2 = K\frac{dx}{dt}$$

$$(e_2-e_1) = K_1\frac{dx}{dt}$$

$$K\frac{dx}{dt}-e_1 = K_1\frac{dx}{dt}$$

$$e_1 = (K-K_1)\frac{dx}{dt}$$

$$x = \frac{1}{K-K_1}\int e_1 dt + \text{constant}$$

Thus it is seen that $x$ is a function of $e_1$, and measurement of $x$ over a definite time interval can be used to obtain a measurement of an average value of $e_1$ or $$V\frac{L_0}{L}$$

for the same interval.

The tachometer-generator 35 is mechanically connected to the arm 38 of a potentiometer 39 through suitable reduction gearing. Consequently the distance which the arm travels during time interval $t$ furnishes a measure of the number of revolutions $x$ during this interval. The slide wire of potentiometer 39 is electrically connected to a suitable D.-C. voltage source, whereby arm 38 transmits a voltage proportionate to the computed average value of $$V\frac{L_0}{L}$$

during the interval $t$. This value is taken as $V_0$ the corrected grate speed.

After the computed value $V_0$ has been utilized, as hereinafter explained, the potentiometer arm 38 is reset to its zero position. For this purpose, the connection between arm 29 and the first input terminal of amplifier 33 contains a contact $B_1$ of a relay B and the connection between the generator 35 and the other input terminal of the amplifier contains a contact $B_2$ of relay B, which contacts are closed while the integrator is performing a computation. A contact $B_3$ of relay B is adapted to connect the first input terminal to a ground 40. A contact $B_4$ of relay B is adapted to connect the other input terminal to arm 38 of potentiometer 39. Additional contacts $B_5$ of relay B are adapted to connect servomotor 34 to the A.-C. source 36, bypassing contacts $A_2$. Contacts $B_3$, $B_4$ and $B_5$ are open while the integrator is performing a computation. Relay B itself is part of the timer circuit hereinafter described. When the potentiometer arm is to be reset, contacts $B_1$ and $B_2$ open and contacts $B_3$, $B_4$ and $B_5$ close. The servomotor 34 runs in the reverse direction until the voltages applied to the two input terminals of the amplifier 33 are equal. Since one terminal is grounded at 40, these voltages become equal when the other terminal is grounded, that is, when the potentiometer arm 38 reaches its zero setting. The integrator in effect becomes a null-seeking device while it is resetting the arm.

Memory Device

Before the arm 38 is reset, the voltage which it transmits proportionate to $V_0$ is applied to a memory device 42. The memory device includes an electronic conversion amplifier 43 (similar to amplifiers 22 and 33), a servomotor 44, and a potentiometer 45 whose arm 46 is mechanically connected to the servomotor. The slide wire of potentiometer 45 is electrically connected to a suitable D.-C. source. Arm 38 is electrically connected to one input terminal of amplifier 43, whereby the voltage applied to this terminal is proportionate to $V_0$. Arm 46 is electrically connected to the other input terminal of the amplifier, whereby the voltage applied to this terminal equals that applied to the slide wire of potentiometer 45 multiplied by a fraction whose value depends on the linear position of arm 46 with respect to the slide wire. Amplifier 43 and servomotor 44 are electrically connected to a suitable A.-C. source 47. The output terminals of amplifier 43 are electrically connected to a field winding 48 of the servomotor. The action of the memory device is similar to that of the divider 21; that is, the servomotor 44 stops after moving arm 46 to a linear position along its slide wire representaitve of the computed value of $V_0$. Normally open contacts $C_1$ of a relay C are connected in the A.-C. circuit 47. The relay itself is part of the timer circuit hereinafter described. Contacts $C_1$ automatically close long enough to enable the servomotor 44 of the memory device to set the potentiometer arm 46 to the new value of $V_0$ computed by the integrator. Thereafter these contacts reopen to hold the arm at this setting until another new setting is computed.

The servomotor 44 of the memory device 42 also is mechanically connected to the arm 51 of a potentiometer 52, which is electrically connected to a suitable D.-C. source. Arm 51 thus assumes a position in accordance with the computed value of $V_0$, and transmits a proportionate voltage. Arm 51 is electrically connected to a speed regulating device 53 for the D.-C. motor 12 which propels the grate 10. The speed regulating device illustrated includes a motor-generator 54 and a magnetic amplifier 55, which has a control winding 56. Arm 51 applies a voltage to this winding proportionate to $V_0$. The magnetic amplifier and the motor portion of the motor-generator are connected to suitable A.-C. sources. The magnetic amplifier is connected to a field winding 57 of the D.-C. generator, whereby the voltage applied to the field winding, and hence the output voltage of the generator, vary with the voltage applied to the control winding 56 or $V_0$. The generator is electrically connected to the D.-C. motor 12, whose speed thus is governed by this same voltage. Arm 51 also is electrically connected to the slide wire of potentiometer 31 and transmits a voltage thereto to be used as V or the present grate speed in the next computation. We have not described the magnetic amplifier in detail since it is a known device, but for a complete description reference can be made to Storm, "Magnetic Amplifiers," copyright 1955, by General Electric Company. An explanation of the way a magnetic amplifier can be used as a voltage regulator for a D.-C. generator appears on pages 418 and 419 of this publication.

Manual Adjustment

Preferably the circuit also includes means for adjusting the speed of motor 12 manually. Normally closed contacts $D_1$ of a relay D are connected between the potentiometer arm 38 and the memory device 42. A manually adjustable potentiometer 58 is connected to the memory device through a set of normally open contacts $D_2$. Relay D itself is shown with the timer circuit. When manual control is to be employed, relay D is energized. Contacts $D_1$ open and disconnect the integrator 32 and preceding parts from the memory device 42. Contacts $D_2$ close and connect potentiometer 58 to the memory device, whereby the voltage applied to the memory device can be set manually through potentiometer 58. Circuit 47 to the servomotor 44 of the memory device contains normally open contacts $D_3$ which close when relay D is energized. The memory device acts on the speed regulating device 53 the same as when the automatic control means is connected.

Timer Circuit

FIGURE 2 is a schematic wiring diagram of a preferred timer circuit. In addition to the relays A, B, C and D already mentioned, the circuit includes another relay E, two interval timers 60 and 61, and a switch 62 for setting the control to "manual" or "automatic." Timers 60 and 61 are of a type which have an adjustable "off-time" and an adjustable "on-time" that repeat as long as the timer is running. Such timers per se are known and are available commercially; hence no detailed showing is deemed necessary. However, reference can be made to a printed publication of General Electric Company, entitled "TSA–18 Industrial Interval Timer," for a complete showing and description. The circuit is energized from two lines 63 and 64 connected to a suitable voltage source. Switch 62 and the coil of relay D are connected in series across lines 63 and 64. For automatic operation the switch is open and the relay deenergized, and for manual operation the reverse. Relay D has normally closed contacts $D_4$ which connect the other relays and the timers to line 63 as long as relay D is deenergized, but break this connection when the relay is energized.

Timer 60 runs all the while the control is set for automatic operation. It has contacts $60a$ which open during its "off-time" and close during its "on-time." The "on-time" defines the interval $t$, hereinbefore referred to, during which a corrected speed $V_0$ is computed. Contacts $60a$ and the coil of relay A are connected in series across lines 63 and 64, whereby the relay picks up during the "on-time" and drops out during the "off-time." When relay A picks up, its normally open contacts $A_1$ and $A_2$ close to operate servomotors 23 and 34 of the divider 21 and integrator 32 respectively, as already described. The coil of relay E, normally open contacts $A_3$ of relay A, and normally closed contacts $C_2$ of relay C are connected in series across lines 63 and 64, whereby relay E picks up with relay A. Relay E has normally open contacts $E_1$ through which it seals in, bypassing contacts $A_3$. The coil of relay B, normally closed contacts $E_2$ of relay E, and normally closed contacts $C_3$ of relay C are connected in series across lines 63 and 64, whereby relay B is normally energized, but drops out when relay E picks up. When relay B drops out, contacts $B_1$ and $B_2$ close to apply the voltages from arm 29 of potentiometer 31 and from the tachometer-generator 35 to the input terminals of the amplifier 33 of the integrator; contacts $B_3$ and $B_4$ open to break the connections to the ground 40 and to the arm of potentiometer 39. Contacts $B_5$ open so that the servomotor 34 can be energized only via contacts $A_2$. Since relay B is normally energized, FIGURE 2 shows contacts $B_1$ and $B_2$ open even though they actually are back contacts and contacts $B_3$, $B_4$ and $B_5$ closed even though they actually are front contacts.

Other normally open contacts $A_4$ of relay A and timer 61 are connected in series across lines 63 and 64, whereby timer 61 is energized when relay A picks up. Timer 61 does not run continuously like timer 60, but is set to operate through only a single cycle of "off-time" and "on-time" whenever it is energized. Otherwise any synchronization errors in the timers would be cumulative, and soon would upset the sequence of operations. Timer 61 is also connected to line 63 through a conductor 65 and remains energized through this conductor after relay A drops out. The "on-time" of timer 60 ends an instant before the "on-time" of timer 61 commences. When the "on-time" of timer 60 ends, contacts 60a open, relay A drops out, and servomotors 23 and 34 stop. When the "on-time" of timer 61 commences, the timer closes contacts 61a which are connected in series with the coil of relay C across lines 63 and 64. Relay C picks up and closes its contacts $C_1$ to operate the servomotor 44 of the memory device 42. As long as relay D remains deenergized, the amplifier 43 of the memory device remains connected to arm 38 of potentiometer 39. The "on-time" of timer 61 is sufficient that the servomotor 44 operates long enough to set the memory device to the corrected speed $V_0$. Subsequently timer 61 is deenergized, whereupon contacts 61a open, and relay C drops out.

When relay C picks up, its normally closed contacts $C_2$ and $C_3$ open. Opening of contacts $C_2$ drops out relay E, but opening of contacts $C_3$ for the moment prevents relay B from picking up. When relay C drops out, relay B picks up, whereupon its contacts $B_3$ and $B_4$ connect the amplifier 33 of the integrator to ground 40 and to the potentiometer arm 38, and its contacts $B_5$ energize the servomotor 34. Thus the potentiometer 39 is reset. It should be noted that relay B cannot be energized until both relays A and C are deenergized; consequently, the potentiometer 39 can be reset only when resetting does not interfere with other operations.

When our control is operated manually, switch 62 is closed and relay D picks up. Contacts $D_1$ and $D_4$ open, whereby the electrical connections are broken between the potentiometer arm 38 and amplifier 43 of the memory device 42 and between line 63 and the timer 60. Contacts $D_2$ close and establish a connection between the manually operated potentiometer 58 and amplifier 43. Contacts $D_3$ close and establish a connection between the A.-C. circuit 47 and the servomotor 44 of the memory device. The way in which the memory device can be set manually with the contacts in these positions has already been explained.

*Operating Sequence*

FIGURE 3 shows a typical sequence diagram for our control when applied to a sintering machine and set for automatic operation. Intially timer 60 is running but is registering "off-time," timer 61 is stopped, and relay B is energized. Thus no computation is taking place and relay B maintains the integrator 32 and potentiometer arm 38 in a reset or zero position. Presently the "on-time" of timer 60 commences. The timer circuit already described drops out relay B and starts timer 61, which at first registers "off-time." The divider 21 and integrator 32 now make their computation of a corrected speed, and potentiometer arm 38 is positioned accordingly. After an interval $t$ the "on-time" of timer 60 ends and the timer goes back into "off-time." An instant later the "on-time" of timer 61 commences, but relay B remains deenergized. The potentiometer arm 38 remains positioned in accordance with this computed speed while the memory device 42 positions the potentiometer arm 51 accordingly. The speed of the drive motor 12 is corrected simultaneously with the positioning of arm 51. Subsequently the "on-time" of timer 61 ends and this timer stops. Relay B picks up to reset the potentiometer arm 38, but the potentiometer arm 51 retains its setting until a new computation is made.

In the example of a sintering machine, the interval between computations should approximate the time required for a particle to travel from the feed end of the grate to the discharge end, typically about 10 to 20 minutes. The duration of a computation should be sufficient to furnish a respective average of conditions prevalent on the grate, typically about 1 to 2 minutes. The interval for setting the memory device should be long enough only for the parts to reach their computed positions, allowing a reasonable margin, typically about 15 to 30 seconds. Thus timer 60 can be set for about 10 to 20 minutes "off-time" and about 1 to 2 minutes "on-time," and timer 61 for "off-time" an instant longer than the "on-time" of timer 60 and about 15 to 30 seconds "on-time."

From the foregoing description, it is seen that our invention affords a simple and completely automatic control for machine speed to assure that an action takes place at a desired location. The instruments required are all of standard manufacture. As previously mentioned, if minor fluctuations are not a factor, the device can be simplified by eliminating the integrator. If such fluctuations occur but are of short duration, a resistance and condenser can be connected in parallel between the divider and memory device to smooth out the voltage transmitted to the latter, replacing the integrator.

While we have shown and described a preferred embodiment of the invention, it is apparent that modifications may arise. Therefore, we do not wish to be limited to the disclosure set forth but only by the scope of the appended claims.

We claim:

1. The combination, with a traveling member adapted to have an action take place thereon, means indicating the actual location of the action, and a variable speed drive for said member, of a control for said drive comprising a computing means operatively connected with said indicating means for determining the magnitude of variance between the actual and desired locations of the action and means operatively connecting said computing means and said drive for periodically changing the drive speed by an amount proportional to the variance, whereby said drive commences to operate at a corrected speed which shifts the action to the desired location.

2. A combination as defined in claim 1 in which said traveling member is the grate of a traveling grate sintering machine, and said action is the burning through to the grate surface of a bed of sinter mix carried by said grate.

3. The combination, with a traveling member adapted to have an action take place thereon, means indicating the actual location of the action and a variable speed drive for said member, of a control for said drive comprising a first computing means for determining the magnitude of variance between the actual and desired locations of the action, a second computing means operatively connected with said first computing means for determining a corrected speed needed to shift the action to the desired location, the corrected speed differing from the present speed by an amount proportional to the variance, and means operatively connecting said second computing means and said drive for periodically changing the speed to the computed corrected speed.

4. The combination, with a traveling member adapted to have an action take place thereon, means indicating the actual location of the action, and a variable speed drive for said member, of a control for said drive comprising a first computing means operatively connected with said indicating means for determining the magnitude of variance between the actual and desired locations of the action as a ratio, a second computing means operatively connected with said first computing means and said drive for utilizing this ratio and the present speed to compute a corrected speed needed to shift the action to the desired location, and means operatively connecting said second computing means and said drive for periodically changing the speed to the computed corrected speed and holding this speed until another corrected speed has been computed.

5. The combination, with a traveling member adapted to have an action take place thereon, means indicating the actual location of the action, and a variable speed drive for said member, of a control for said drive comprising a first computing means operatively connected with said indicating means for determining the magnitude of variance between the actual and desired locations of the action, a second computing means operatively connected with said first computing means for determining a corrected speed needed to shift the action to the desired location but eliminating the effect of minor fluctuations in the location, and a memory device operatively connected with said second computing means and adapted periodically to be set thereby in accordance with the corrected speed, said memory device being operatively connected with said drive for changing its speed to the computed corrected speed and holding this speed until another corrected speed has been computed.

6. The combination, with a traveling member adapted to have an action take place thereon, means indicating the actual location of the action, and a variable speed drive for said member, of a control for said drive comprising a first computing means operatively connected with said indicating means for determining the magnitude of variance between the actual and desired locations of the action as a ratio, a second computing means operatively connected with said first computing means and said drive for periodically utilizing the ratio and the present speed to compute as an average over an interval of sufficient duration to eliminate the effects of minor fluctuations a corrected speed needed to shift the action to the desired location, and means for periodically changing the speed of said drive to the computed corrected speed and holding this speed until another corrected speed has been computed.

7. The combination, with a traveling member adapted to have an action take place thereon, means indicating the distance between a fixed datum line on the member and the actual location of the action, set point means for indicating the distance between the same datum line and the desired location of the action, and a variable speed drive for said member, of a control for said drive comprising a divider operatively connected with both said indicating means for computing the ratio of the two distances indicated thereby, means operatively connected with said divider for computing from this ratio as an average over an interval of sufficient duration to eliminate effects of minor fluctuations a corrected speed needed to shift the action to the desired location, a memory device operatively connected with said computing means for periodically receiving and retaining a setting in accordance with the computed corrected speed, and means operatively connecting said memory device and said drive for changing the speed to the computed corrected speed and holding this speed until another corrected speed has been computed.

8. The combination, with a traveling member adapted to have an action take place thereon, means indicating the distance between a fixed datum line on the member and the actual location of the action, set point means for indicating the distance between the same datum line and the desired location of the action, and a variable speed drive for said member, of a control for said drive comprising a divider operatively connected with both said indicating means for computing the ratio of the two distances indicated thereby, means operatively connected with said divider for multiplying this ratio by the present speed of said member and thus computing a corrected speed needed to shift the action to the desired location, integrating means operatively connected with said multiplying means for computing an average value of the corrected speed over an interval of sufficient duration to eliminate the effects of minor fluctuations, a memory device operatively connected with said integrating means for periodically receiving and retaining a setting in accordance with the average value of the computed corrected speed, and means operatively connecting said memory device and said drive for changing the speed to the computed corrected speed and holding this speed until another corrected speed has been computed.

9. In a sintering machine which includes a traveling grate, a burn-through indicator for determining the actual location of the burn-through point on said grate, and a variable speed drive for said grate, the combination therewith of a control for said drive comprising a first computing means operatively connected with said indicator for determining the magnitude of variance between the actual and desired locations of the burn-through point, a second computing means operatively connected with said first computing means for determining a corrected machine speed needed to shift the burn-through point to the desired location, the corrected speed differing from the present speed by an amount proportional to the variance, and means operatively connected with said second computing means and said drive for periodically changing the machine speed to the computed corrected speed and holding this speed until another corrected speed has been computed.

10. In a sintering machine which includes a traveling grate, a burn-through indicator for determining the actual location of the burn-through point on said grate, and a variable speed drive for said grate, the combination therewith of a control for said drive comprising a first computing means operatively connected with said indicator for determining the magnitude of variance between the actual and desired locations of the burn-through point, a second computing means operatively connected with said first computing means for determining as an average over an interval of sufficient duration to eliminate minor fluctuations a corrected machine speed needed to shift the burn-through point to the desired location, the corrected speed differing from the present speed by an amount proportional to the variance, and means operatively connected with said second computing means and said drive for periodically changing the machine speed to the computed corrected speed and holding this speed until another corrected speed is computed.

11. In a sintering machine which includes a traveling grate, an ignition device above said grate, a burn-through indicator for indicating the actual distance between said ignition device and the burn-through point, a set point indicator for indicating the desired distance therebetween, and a variable speed drive for said grate, the combination therewith of a control for said drive comprising a divider operatively connected with both said indicators for computing the ratio of the two distances indicated thereby, computing means operatively connected with said divider for utilizing this ratio and the present machine speed to compute a corrected speed needed to shift the burn-through point to the desired location, and means operatively connecting said computing means and said drive for periodically changing the machine speed to the computed corrected speed and holding this speed until another corrected speed has been computed.

12. In a sintering machine which includes a traveling grate, an ignition device above said grate, a burn-through indicator for indicating the actual distance between said ignition device and the burn-through point, a set point indicator for indicating the desired distance therebetween, and a variable speed drive for said grate, the combination therewith of a control for said drive comprising a divider operatively connected with both said indicators for computing the ratio of the two distances indicated thereby, means operatively connected with said divider for computing from this ratio as an average over an interval of sufficient duration to eliminate minor fluctuations a corrected speed needed to shift the burn-through point to the desired location, a memory device operatively connected with said computing means for periodically receiving and retaining a setting in accordance with the computed corrected speed, and means operatively connecting said memory device and said drive for changing the machine speed to the computed corrected speed and holding this speed until another corrected speed has been computed.

13. In a sintering machine which includes a traveling grate, an ignition device above said grate, a burn-through indicator for indicating the actual distance between said ignition device and the burn-through point, a set point indicator for indicating the desired distance therebetween, and a variable speed drive for said grate, the combination therewith of a control for said drive comprising a divider operatively connected with both said indicators for computing the ratio of the two distances indicated thereby, means operatively connected with said divider for multiplying this ratio by the present speed and thus computing a corrected speed needed to shift the burn-through point to the desired location, means operatively connected with said multiplying means for eliminating effects of minor fluctuations, and means operatively connecting said last named means and said drive for periodically changing the machine speed to the computed corrected speed and holding this speed until another corrected speed has been computed.

14. In a sintering machine which includes a traveling grate, an ignition device above said grate, a burn-through indicator for indicating the actual distance between said ignition device and the burn-through point, a set point indicator for indicating the desired distance therebetween, and a variable speed drive for said grate, the combination therewith of a control for said drive comprising a divider operatively connected with both said indicators for computing the ratio of the two distances indicated thereby, means operatively connected with said divider for multiplying this ratio by the present speed and thus computing a corrected speed needed to shift the burn-through point to the desired location, an integrator operatively connected with said multiplying means for computing an average value of the corrected speed over an interval of sufficient duration to eliminate the effects of minor fluctuations, a memory device operatively connected with said integrator for periodically receiving and retaining a setting in accordance with the average value of the computed corrected speed, and means operatively connecting said memory device and said drive for changing the machine speed to the computed corrected speed and holding this speed until another corrected speed has been computed.

15. A method of controlling the speed of a traveling member on which an action takes place comprising measuring the actual location of the action, computing the magnitude of variance between the actual and desired locations of the action, computing a corrected speed needed to shift the action to the desired location, the corrected speed differing from the present speed by an amount proportional to the variance, and periodically changing the speed to the computed corrected speed.

16. A method as defined in claim 15 comprising a further step of averaging the computed corrected speed over an interval sufficient to eliminate effects of minor fluctuations before changing the speed.

17. A method as defined in claim 15 in which the traveling member is the grate of a traveling grate sintering machine, and the action is the burning through to the grate surface of a bed of sinter mix carried by the grate.

18. A method as defined in claim 17 in which the period between speed corrections approximates the period required for a particle to travel the length of said grate.

References Cited in the file of this patent

UNITED STATES PATENTS

| | | |
|---|---|---|
| 2,072,078 | Bloomsburg et al. | Mar. 2, 1937 |
| 2,184,975 | MacConville et al. | Dec. 26, 1939 |
| 2,273,126 | McGillin | Feb. 17, 1942 |
| 2,423,540 | Wills | July 8, 1947 |
| 2,616,296 | Wannamaker | Nov. 4, 1952 |
| 2,646,681 | Walton | July 28, 1953 |
| 2,878,003 | Dykeman et al. | Mar. 17, 1959 |

FOREIGN PATENTS

| | | |
|---|---|---|
| 461,040 | Canada | Nov. 15, 1949 |